United States Patent
Hölzl et al.

(10) Patent No.: US 7,619,236 B2
(45) Date of Patent: Nov. 17, 2009

(54) DRIVING APPARATUS FOR OPTICAL SCANNING DEVICE

(75) Inventors: Johannes Hölzl, Grasbrunn (DE); Werner Stahl, Kirchheim (DE)

(73) Assignee: Agfa-Gevaert HealthCare GmbH, Cologne (DE)

( * ) Notice: Subject to any disclaimer, the term of this patent is extended or adjusted under 35 U.S.C. 154(b) by 547 days.

(21) Appl. No.: 11/567,030

(22) Filed: Dec. 5, 2006

(65) Prior Publication Data
US 2007/0153968 A1 Jul. 5, 2007

(30) Foreign Application Priority Data
Dec. 29, 2005 (EP) .................................. 05113052

(51) Int. Cl.
*G01T 1/105* (2006.01)
(52) U.S. Cl. ...................................... 250/584
(58) Field of Classification Search ................... 250/584
See application file for complete search history.

(56) References Cited

U.S. PATENT DOCUMENTS

| | | |
|---|---|---|
| 4,372,222 A | 2/1983 | Tice |
| 4,597,303 A | 7/1986 | Nakaya |
| 5,413,265 A | 5/1995 | Stahl et al. |
| 5,898,184 A | 4/1999 | Stahl et al. |
| 6,407,380 B1 | 6/2002 | Sung |
| 6,703,636 B1 | 3/2004 | Gebele et al. |
| 6,897,453 B2 | 5/2005 | Stahl et al. |
| 6,969,007 B2 | 11/2005 | Stahl et al. |
| 6,998,633 B2 | 2/2006 | Stahl |
| 7,005,655 B2 | 2/2006 | Stahl et al. |
| 2003/0057389 A1 | 3/2003 | Gebele et al. |
| 2004/0004198 A1 | 1/2004 | Stahl |
| 2005/0104011 A1 | 5/2005 | Schindlbeck et al. |
| 2005/0218355 A1 | 10/2005 | Melzer et al. |
| 2006/0091336 A1 | 5/2006 | Muller et al. |
| 2006/0113500 A1 | 6/2006 | Auer et al. |

FOREIGN PATENT DOCUMENTS

| | | |
|---|---|---|
| EP | 0 599 100 A1 | 6/1994 |
| EP | 1 263 207 A1 | 12/2002 |
| EP | 1 324 117 A1 | 7/2003 |
| EP | 1 533 654 A1 | 5/2005 |

OTHER PUBLICATIONS

English translation of abstract for EP 1 324 117 A1.
English translation of abstract for EP 1 263 207 A1.
English translation of abstract for EP 1 533 654 A1.
International Search Report for EP 05113052.4, filed on Dec. 29, 2005.

*Primary Examiner*—David P Porta
*Assistant Examiner*—Mark R Gaworecki
(74) *Attorney, Agent, or Firm*—Houston Eliseeva LLP

(57) ABSTRACT

A driving apparatus (1) for an optical scanning device (5) has a threaded spindle (16) onto which a spindle nut (23) is threaded. The driving apparatus (1) further includes a coupler (24) for coupling the spindle nut (23) to the scanning device (5). The coupler (24) effects a Cardan coupling in the manner of a Cardan joint. In a technically simple way particularly good synchronisation can be guaranteed during scanning.

11 Claims, 6 Drawing Sheets

DRIVING APPARATUS FOR OPTICAL SCANNING DEVICE

RELATED APPLICATIONS

This application claims priority to European Application No. EP05011305 2.4, filed Dec. 29, 2006, which is incorporated herein by reference in its entirety.

BACKGROUND OF THE INVENTION

Optical scanning devices are known in particular from the field of computer radiography (CR). A picture of an object, for example a patient or a body part of the patient, is produced here by means of X-ray radiation, and this is stored in a storage phosphor layer as a latent picture. This type of X-ray picture therefore contains X-ray information about the object. In order to read out, i.e. scan, the X-ray information stored in the storage phosphor layer, the storage phosphor layer is stimulated by means of stimulation radiation. As a result of this stimulation, the storage phosphor layer emits light which has an intensity corresponding to the X-ray information stored in the storage phosphor layer. The light emitted from the storage phosphor layer is collected by the scanning device and converted into electric signals which contain an image of the X-ray information. The electric signals are further processed, and the X-ray information stored in the storage phosphor layer is then made visible. The X-ray information can be shown directly on a monitor, for example, or by means of a printer used specially for X-ray pictures, on a photographic X-ray film.

For scanning, an even relative movement is required between the storage phosphor layer and the scanning device. Very stringent requirements exist here with regard to the synchronisation of the relative movement so as to avoid distortion in the X-ray picture.

A driving apparatus for an optical scanning device is known from EP 1 263 207 A1. This driving apparatus includes a cable which is connected to a motor by means of a friction wheel gear. The cable serves to convert the rotary movement of the output shaft of the motor into a linear movement.

SUMMARY OF THE INVENTION

It is the object of this invention to provide a driving apparatus for an optical sampling device with which particularly good synchronisation can be guaranteed.

This object is fulfilled by a driving apparatus according to the invention, which includes a threaded spindle onto which a spindle nut is threaded. Furthermore, a coupler is provided for coupling the spindle nut to the scanning device, the coupler being designed such that it effects Cardan coupling in the manner of a Cardan joint. This type of Cardan joint is also called a cross or universal joint. The coupler provide at least two Cardan axes of rotation which are offset by 90° in relation to one another.

The Cardan joint allows bending with at the same time power transmission. Unlevelnesses and tolerances on the thread of the threaded spindle and/or on the thread of the spindle nut which can lead to lurching of the spindle nut when it is shifted, and so to fluctuations in the synchronisation of the driving, are advantageously not transferred to the scanning device. The spindle nut can adapt to the course of the threaded spindle without the evenness of the shift movement thus being effected for the scanning device. In this way, particularly good constancy of the torque between the threaded spindle and the spindle nut can be guaranteed. This leads to particularly good synchronisation of the linear shift movement.

In one advantageous embodiment of the invention, the coupler has a connection piece, which is in particular disk-shaped or discoidal, for connecting to the scanning device, and at least one discoidal joint plate. This at least one discoidal joint plate is disposed between the spindle nut and the connection piece. Here, the spindle nut, the at least one joint plate and the connection piece are preferably disposed parallel to one another.

Preferably, both between the spindle nut and the at least one joint plate and between the at least one joint plate and the connection piece, two diametrically opposed bearings are provided, which form Cardan axes of rotation. One of the axes of rotation therefore extends between the spindle nut and the at least one joint plate, and another of the axes of rotation between the at least one joint plate and the connection piece. Moreover, the axes of rotation extend parallel to the spindle nut, the at least one joint plate and the connection piece. The adjacent axes of rotation are rotated by 90° in relation to one another. The bearings disposed in this way, by means of which the position of the Cardan axes of rotation is given, provide a Cardan connection in a particularly simple way.

In a further advantageous embodiment, in the surface of the spindle nut facing towards the at least one joint plate and in the surface of the at least one joint plate facing towards the spindle nut, two diametrically opposed indentations are respectively provided. These indentations in the surface of the spindle nut lie opposite those in the surface of the at least one joint plate. Balls are disposed between the indentations of the spindle nut lying opposite one another and the at least one joint plate. Furthermore, in the surface of the connection piece facing towards the at least one joint plate and in the surface of the at least one joint plate facing towards the connection piece two diametrically opposed indentations are also respectively provided. The indentations in the surface of the connection piece lie opposite those in the surface of the at least one joint plate. Balls are disposed here between the indentations of the connection peace lying opposite one another and the at least one joint plate. The balls engage here in the indentations. By means of the balls and the indentations, play-free bearings for the Cardan axes of rotation are formed. The bearings' lack of play is also maintained when there is wear and tear of the balls and the indentations. Between the ball surfaces and the indentations lubricants can be added with which the most friction-free rotation possible of the balls is made possible.

In a particularly preferred embodiment of the invention, one of the four indentations of two surfaces lying opposite one another is in the form of an oblong indentation. The oblong indentation is a type of elongated hole. In this way, tolerance equalisation is provided because two pairs of indentations lying opposite one another can not be produced to be exactly congruent.

Preferably, the spindle nut and the connection piece are connected to one another by a connector which is designed and arranged such that it holds the whole coupler together. In this way stable holding together of the individual components of the coupler can be easily guaranteed. It is particularly preferred if the connection mechanism has at least one spring, in particular a tension spring. By means of the tension spring, the spindle nut and the connection piece are pulled together. Advantageously, several springs are provided which are distributed in particular evenly along the peripheral surface of the coupler. In this way particularly good stability of the arrangement is guaranteed.

In a particularly preferred further development of the invention, the coupler is designed such that it effects a Cardan coupling in the manner of a Cardan double joint. With this double joint, two Cardan joints are disposed one behind the other and are connected to one another in the Cardan manner. The Cardan double joint therefore has a total of four Cardan axes of rotation. Irregularities of the one joint can advantageously be cancelled by the other joint. The double joint guarantees almost totally even transfer of movement from the spindle nut to the scanning device. The effective connection point, i.e. the support point, of the spindle nut and the threaded spindle during the shift movement is always in the spindle axis, or at least close to the spindle axis. In this way, practically unavoidable wobbling or lurching of the spindle nut can be allowed without this being transferred substantially to the shift movement of the scanning device. In particular, height impacts, i.e. fluctuations in the direction of movement of the spindle nut, are minimised.

In a preferred variation of the invention, three parallel joint plates are provided which are disposed adjacent to one another and between the spindle nut and the connection piece. By means of these three joint plates and the connection piece the Cardan double joint can be particularly efficiently realised. Cardan axes of rotation are formed between the individual joint plates. The Cardan double joint formed in this way therefore has four axes of rotation, adjacent axes of rotation being respectively rotated in relation to one another by 90°. The Cardan axes of rotation are in particular implemented by means of bearings which can advantageously be realised, as described above, by means of pairs of indentations in the joint plates and balls dropped into these pairs of indentations.

In a particularly preferred embodiment of the invention, the scanning device is a device for reading out X-ray information stored in a storage phosphor layer. When using the driving apparatus according to the invention in this type of scanning device, particularly accurate read-out of the X-ray information is given because exceptionally even movement can be implemented during the read-out. Advantageously, the connection piece of the coupler is designed to be connected to a support onto which the storage phosphor layer is laid. In this way, in order to read out the X-ray information the support is moved, and so the storage phosphor layer lying on the support is moved past a secured irradiation device and a detection device.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
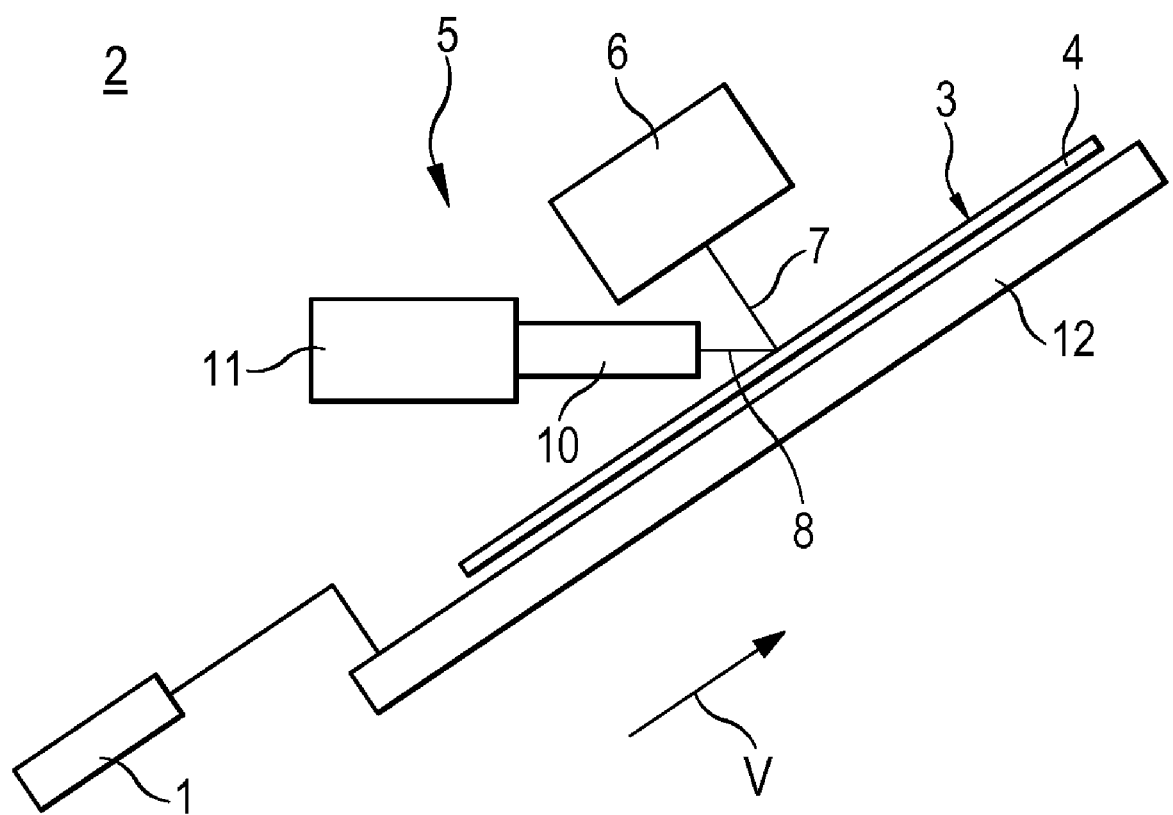
FIG. 1 is a schematic illustration of an example of an application of a driving apparatus according to the invention in a read-out device for reading out X-ray information from a storage phosphor layer.

FIG. 1 shows a schematic illustration of an example of an application of a driving apparatus 1 according to the invention in a read-out device 2 for reading out X-ray information from a storage phosphor layer 3 which is part of a storage phosphor plate 4. The X-ray information was stored in the storage phosphor layer 3 by irradiating it with X-ray radiation. In order to read out the stored X-ray information, the read-out apparatus 2 includes an optical scanning device 5. This scanning device 5 has an irradiation device 6 which serves to irradiate the storage phosphor layer 3 with stimulation radiation 7. The irradiation device 6 is advantageously designed such that the storage phosphor layer 3 is irradiated with stimulation radiation 7 line by line. A so-called "flying spot" irradiation device is used here as the irradiation device 6 with which a laser beam emitted by a laser is aligned to a rotatably mounted polygon mirror. The polygon mirror rotates so that the laser beam is moved over one line of the storage phosphor layer 3. Individual points of the line are stimulated one after the other. Alternatively, a laser diode line, for example, can also be used as the irradiation device 6 which includes a plurality of laser diodes disposed next to one another. With this laser diode line, one line of the storage phosphor layer 3 is at the same time irradiated and stimulated.

As a result of the stimulation of the storage phosphor layer 3 by means of the stimulation radiation 7, the storage phosphor layer 7 emits emission radiation 8, the intensity of which is dependent upon the X-ray information stored in the storage phosphor layer 3. In order to collect the emitted emission radiation 8, the scanning device 5 contains a detection device. In this example of an embodiment the latter contains a light conductor 10 to which a photomultiplier 11 is attached. The light conductor 10 collects emitted emission radiation 8 and conveys it on to the photomultiplier 11. Alternatively, the detection device 10, 11 can, for example, have a line detector which can include a so-called "charge-coupled device" (CCD) line. The CCD line has a plurality of photodetectors disposed parallel and next to one another in a line. By means of the detection device 10, 11 a photoelectric conversion of the emission radiation received can be implemented. Between the irradiation device 6 and the detection device 10, 11 there is a stable connection so that the display of the X-ray information stored in the storage phosphor layer 3, i.e. the stimulation of the storage phosphor layer 3 and the receipt of the radiation 8 emitted as a result of the stimulation, can be precisely matched, and precise allocation is always guaranteed during the actual read-out process too.

Furthermore, the scanning device 5 has a support 12 on which the storage phosphor plate 4 lies for read-out. The support 12 is in particular in the form of a table. In this example of an embodiment, both the irradiation device 6 and the detection device 10, 11 are disposed on the same side of the support 12. The storage phosphor plate 4 lies on the support 12 here such that the storage phosphor layer 3 is facing towards the irradiation device 6 and the detection device 10, 11. A support layer of the storage phosphor plate 4 lies on the support 12 and is a reflecting support layer. The storage phosphor layer 3 is applied to the support layer. It is also possible to dispose the irradiation device 6 on the one side of the support 12 and the detection device 10, 11 on the other side of the support 12. In this case, the support layer is in the form of a transparent support layer.

By means of the driving apparatus 1 according to the invention, the support 12 for reading out the X-ray information stored in the storage phosphor layer 3 is linearly movable in a shift direction V. In this way movement can be produced so as to read out the whole storage phosphor layer 3 by means of line by line stimulation and detection. The irradiation device 6 and the detection device 10, 11 are mounted securely in the read-out apparatus 4 here. Alternatively, the support 12 can be mounted securely in the read-out apparatus 2. In this case, the irradiation device 6 and the detection device 10, 11 are moved past the storage phosphor layer 3 in the shift direction V by means of the driving apparatus 1.

Figure 2A:
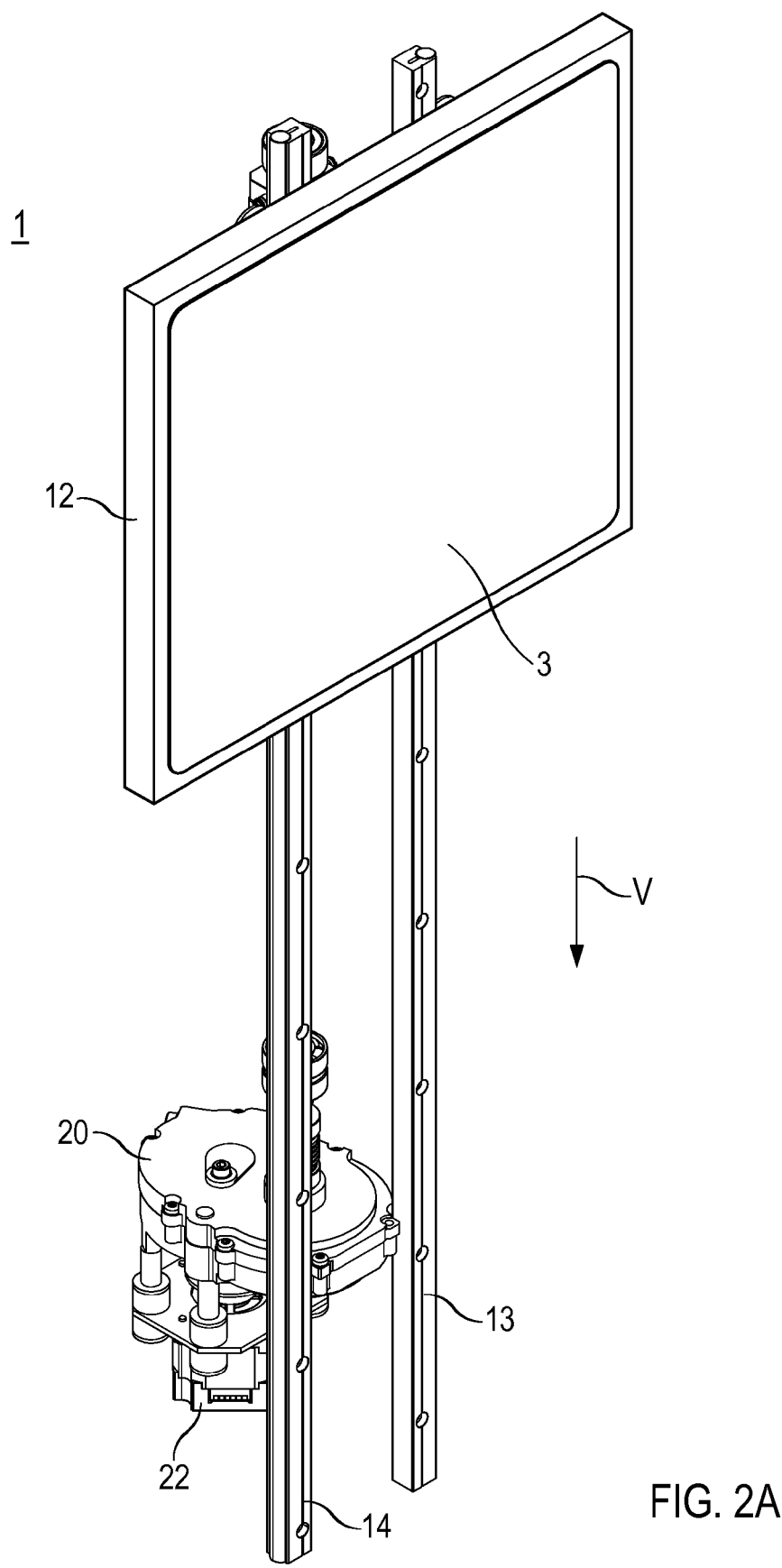
FIG. 2A is a view of the upper side of an example of an embodiment of a driving apparatus according to the invention for actuating a support for a storage phosphor plate.
Figure 2B:
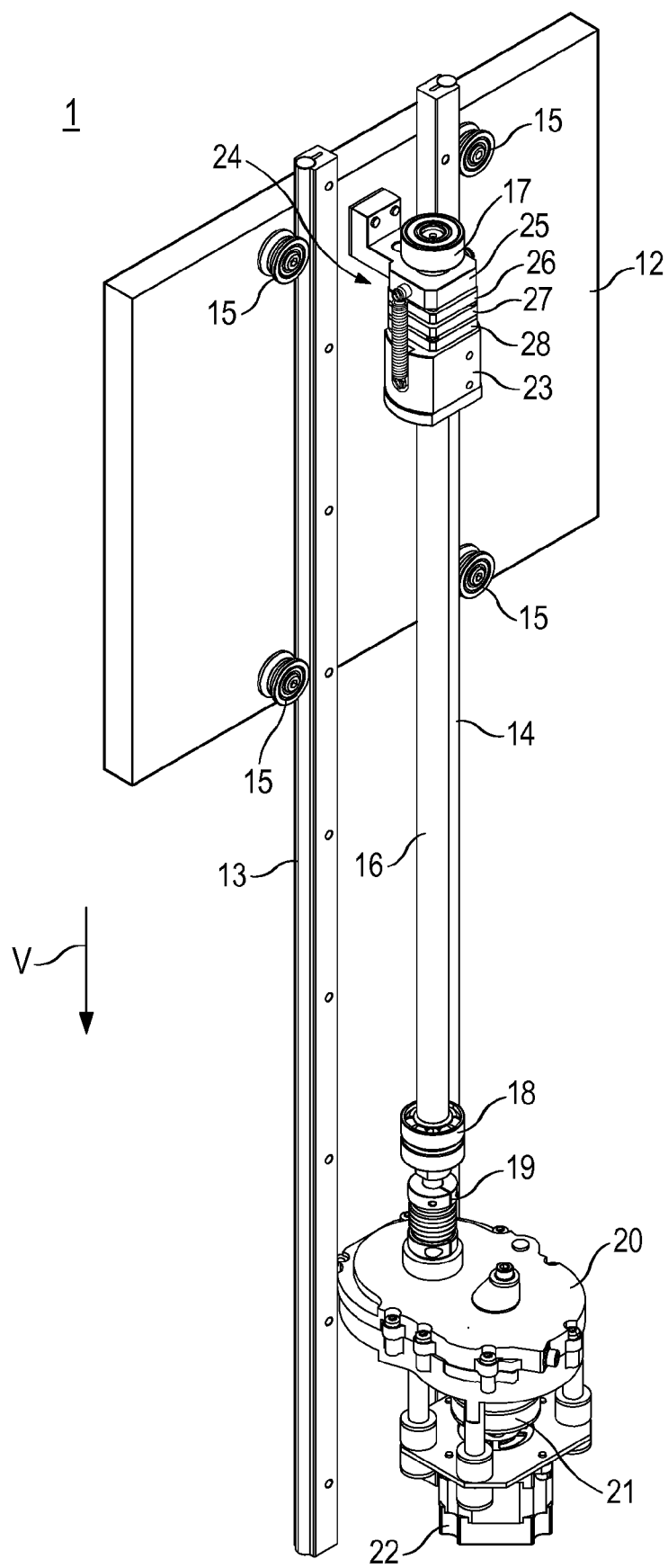
FIG. 2B is a view of the lower side of the driving apparatus according to FIG. 2A.

In order to read out the X-ray information without any distortion, the driving apparatus 1 must guarantee extremely precise synchronisation of the movement of the support 12. FIG. 2A shows a view of the upper side of an example of an embodiment of the driving apparatus 1 according to the invention for actuating the support 12, and FIG. 2B a view of the lower side of the driving apparatus 1. The driving apparatus 1 includes two guide rails 13 and 14 on which the support 12 lies for mounting and guiding. To the lower side of the support 12 are attached four guide rollers 15 which engage in the guide rails 13, 14 at the side. The linear shift movement of the support 12 is implemented by means of a threaded spindle drive. For this, a threaded spindle 16 is provided which extends beneath the support and parallel to the guide rails 13, 14. The threaded spindle 16 is mounted at both of its ends in spindle bearings 17 and 18. At one of its ends the threaded spindle 16 is attached to a step motor 22 by a coupling 19, a friction wheel gear 20, a flywheel and an elastic coupling 21. The step motor 22 has relatively bad synchronisation but the advantages that it is inexpensive and the average revolution speed can be precisely controlled. The bad synchronisation of the step motor 22 is smoothed out by the flywheel which is elastically coupled to the motor 22. The friction wheel gear 20 reduces the excessive revolution speed of the flywheel to a required revolution speed of the threaded spindle 16. The very good synchronisation of the flywheel is not appreciably worsened here. The friction wheel gear 20 is described in greater detail in the previously published patent application EP 1 263 207 Al. With regard to the structure and the mode of operation of the friction wheel gear 20, reference is therefore made to the disclosure content of this patent application. The coupling 19 between the friction wheel gear 20 and the threaded spindle 16 equalises an offset between the friction wheel gear 20 and the spindle bearing 18. The coupling 19 can advantageously be particularly torsion proof.

The threaded spindle 16 serves to convert the rotation movement of a shaft of the friction wheel gear 20 into a linear movement with which the support 12 is to be moved. For this, a spindle nut 23 is threaded onto the threaded spindle 16. The spindle nut 23 is connected by coupler 24 to the support 12 of the scanning device 5. For this, the coupler 24 includes a connection piece 25 with which they are connected to the support 12. Furthermore, the coupler 24 includes three joint plates 26, 27 and 28 which are disposed between the spindle nut 23 and the connection piece 25.

Figure 3:
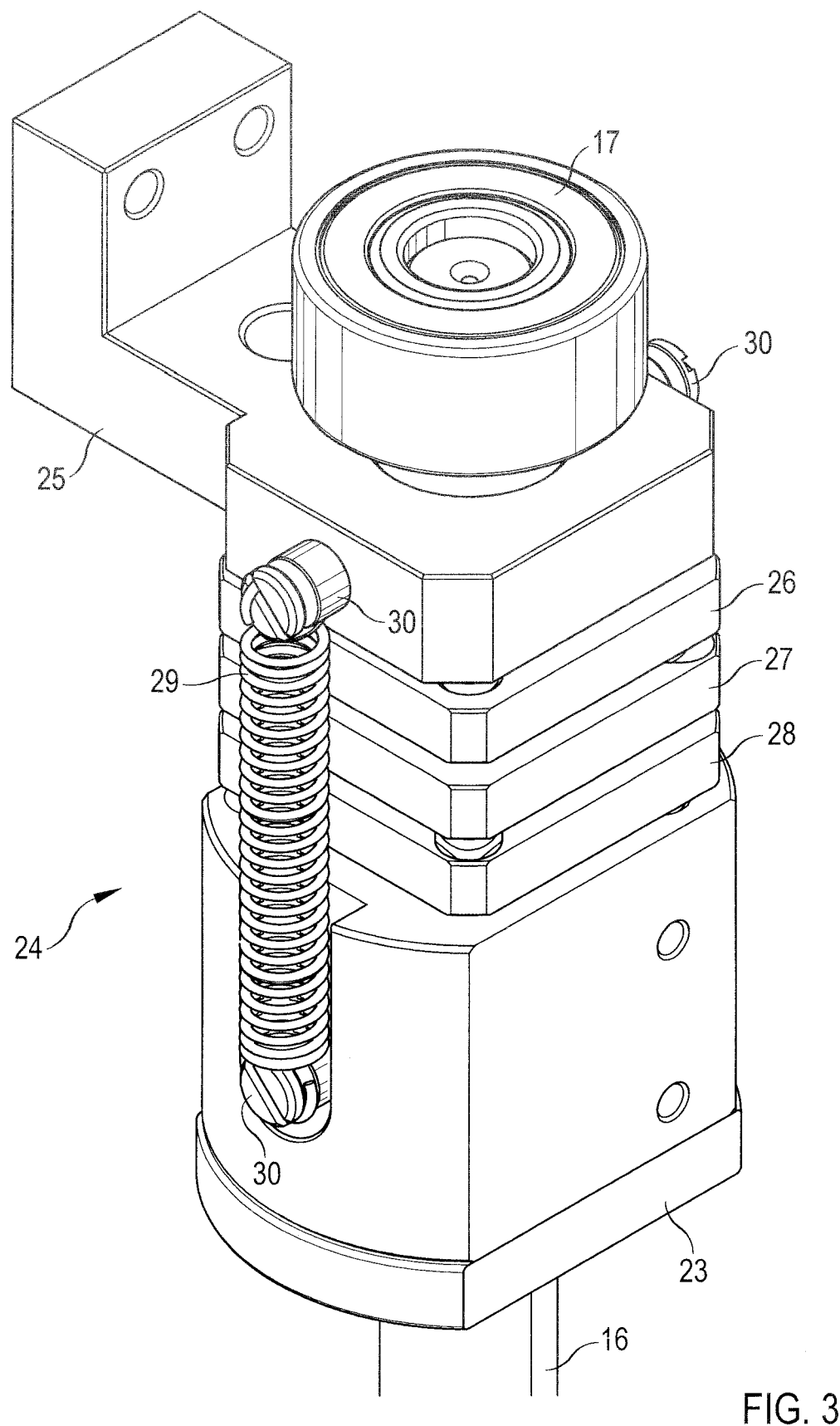
FIG. 3 is an example of an embodiment of coupler of the driving apparatus.

One example of an embodiment of the coupler 24 is shown in greater detail in FIG. 3. The coupler 24 effect a Cardan coupling between the spindle nut 23 and the support 12 in the manner of a Cardan joint. In these examples of embodiments, the coupler 24 effects a Cardan coupling in the manner of a Cardan double joint. For this, four Cardan axes of rotation are provided in the coupler 24 between the spindle nut 23 and the support 12, adjacent axes of rotation being rotated in relation to one another by 90°.

The coupler 24 includes the connection piece 25 which has an L-shaped attachment by means of which they are connected to the lower side of the support 12. The three joint plates 26, 27 and 28 are disposed parallel to one another and are discoidal in form. The joint plates 26, 27, 28 are identical in form. Between the individual joint plates 26, 27, 28, between the joint plate 28 and the spindle nut 23, and between the joint plate 26 and the connection piece 25, two diametrically opposed bearings are respectively provided. The connection piece 25 and the spindle nut 23 are coupled to one another by means of two tension springs 29 disposed on opposite sides. Moreover, two outwardly projecting suspensions 30 are respectively located both on the connection piece 25 and on the spindle nut 23 onto which the tension springs 29 are attached. Only one of the springs 29 is shown in FIG. 3. The second of the springs 29 is located on the opposite side of the coupler 24 which is covered here. The springs 29 serve to hold together the individual components of the coupler 24. Instead of the springs 29, other connection mechanisms can also be used.

Figure 4A:
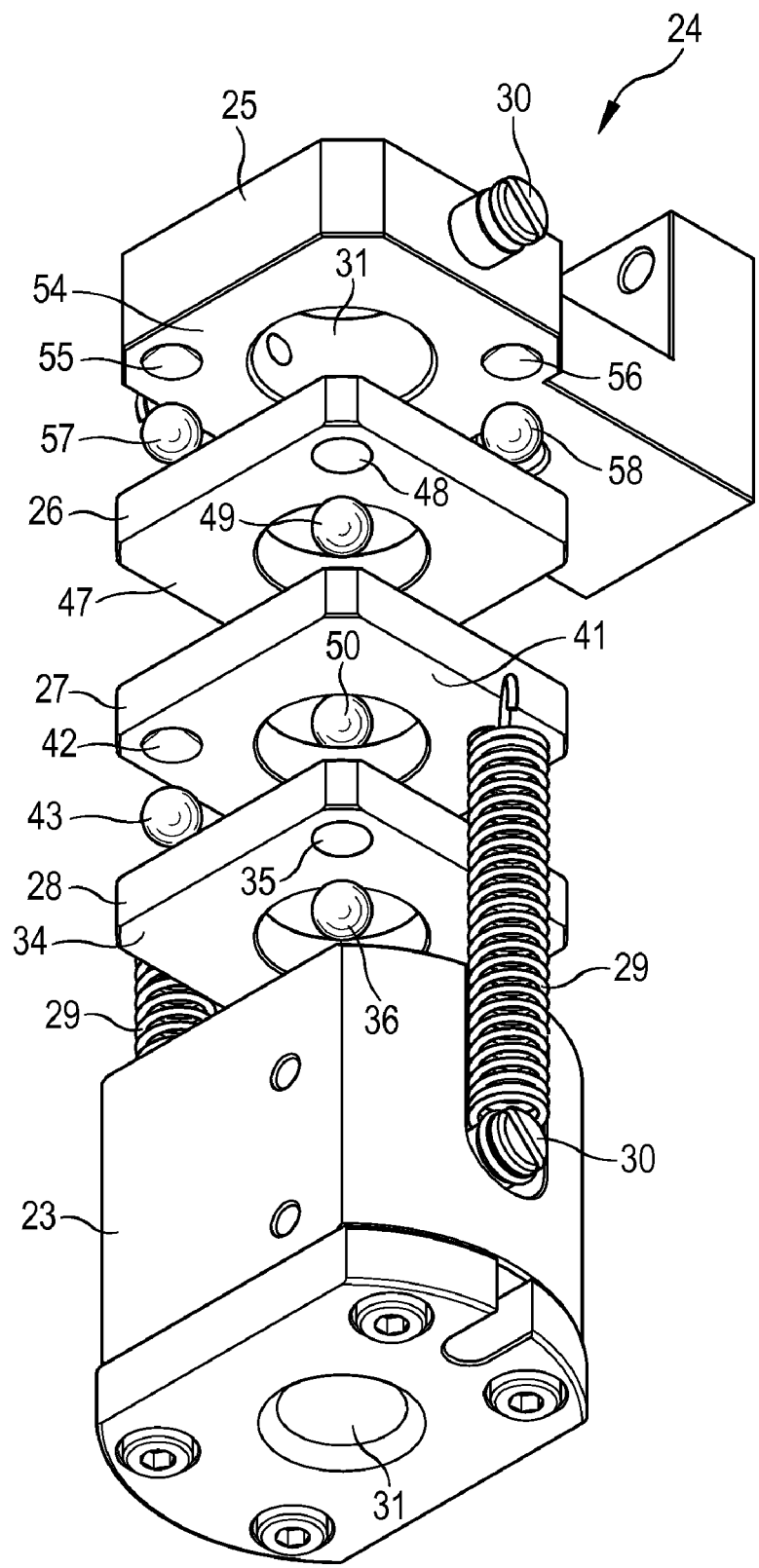
FIG. 4A a view of the individual components of the coupler according to FIG. 3 from a perspective from below.
Figure 4B:
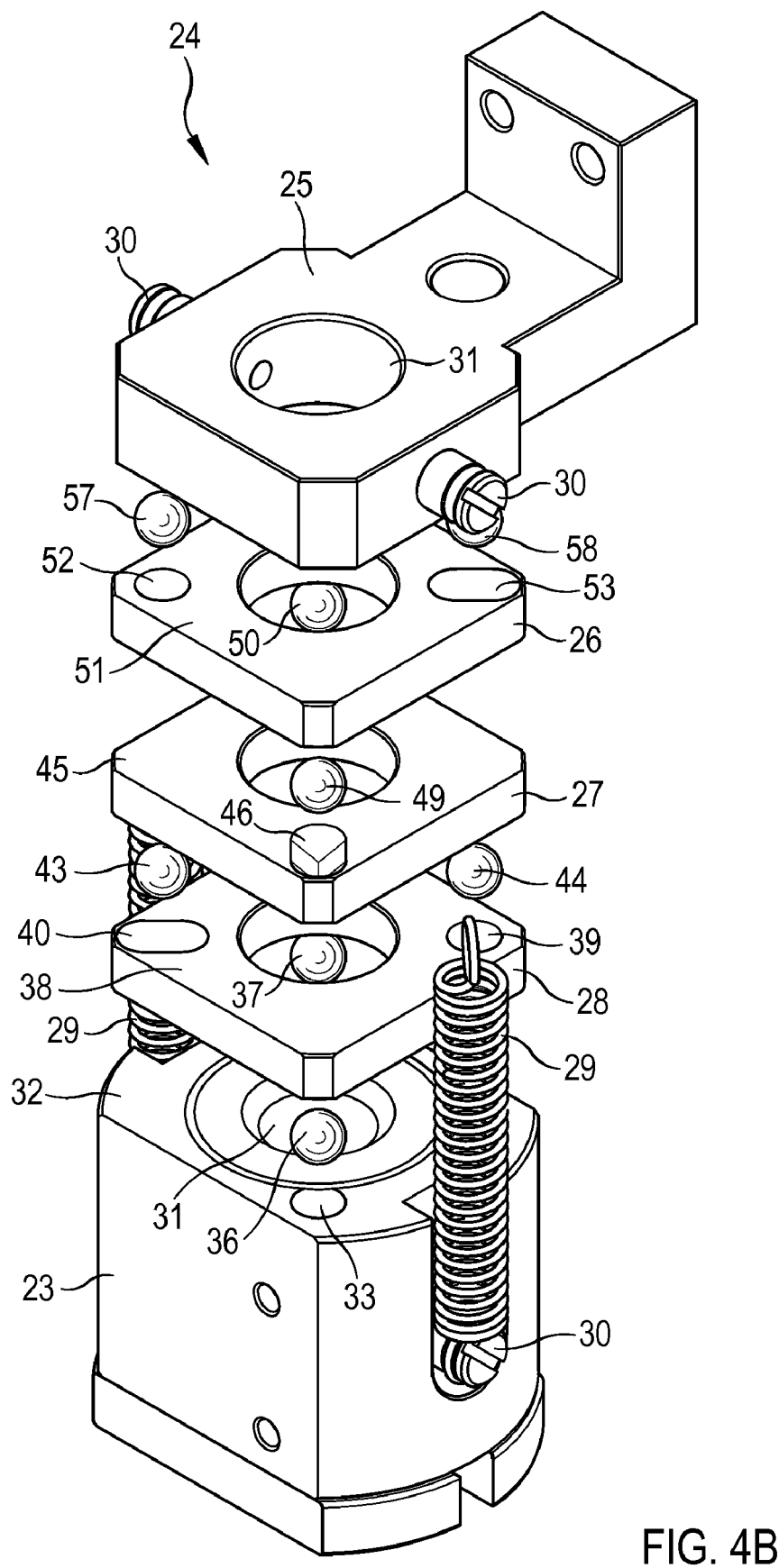
FIG. 4B the view of the individual components of the coupler according to FIG. 3 from a perspective from above.

FIG. 4A shows an exploded view of the individual components of the coupler 24 from a perspective from below, and FIG. 4B shows the exploded view from a perspective from above. FIGS. 4A and 4B show the spindle nut 23, the discoidal joint plates 26, 27, 28 and the connection piece 25 which respectively have a central hole 31 for the threaded spindle 16. The springs 29 are not fitted on the upper suspensions 30 here. The diametrically opposed bearings provided between the individual joint plates 26, 27, 28, between the joint plate 28 and the spindle nut 23 and between the joint plate 26 and the connection piece 25 are realised here by indentations in the opposite surfaces of the individual components and by balls engaging in the indentations.

The spindle nut 23 has a substantially flat surface 32 facing towards the joint plate 28. In this surface 32, two diametrically opposed indentations are provided of which only one, namely an indentation 33, can be seen in FIGS. 4A, 4B. These two indentations in the surface 32 of the spindle nut 23 are also provided with two diametrically opposed indentations in a surface 34 of the joint plate 28 facing towards the spindle nut 23. In FIGS. 4A, 4B one of these indentations, namely an indentation 35 is shown. The indentations in the adjacent surfaces 32, 34 of the spindle nut 23 and the joint plate 28 are disposed lying opposite one another. One of these indentations (not shown) on the surface 32 is oblong and is in the form of a wedge-shaped counterbore, whereas the other indentations of the two surfaces 32, 34 preferably have a conical depth profile. Balls 36 and 37 are disposed between the indentations of the spindle nut 32 lying opposite one another and the joint plate 28. When the coupler 24 is in assembled state, the ball 26 engages in the indentations 33 and 35 and the ball 37 in the two indentations (not shown) of the surfaces 32 and 34. The combination in pairs of two diametrically opposed bearings which are realised here by the ball 36 engaging in the indentations 33, 35 and the ball 37 engaging in the two indentations (not shown) of the surfaces 32, 34 forms a Cardan axis of rotation around which the spindle nut 32 and the joint plate 28 can rotate. The principle of this arrangement of the bearings and its structure is continued in the coupler 24. Two adjacent Cardan axes of rotation are rotated in relation to one another here by 90°. The bearings are correspondingly designed and arranged.

The joint plate 28 has a further surface 38 which is facing towards the joint plate 27. In this surface 38, two diametrically opposed indentations 39 and 40 are provided. These two indentations 39, 40 are also provided with two diametrically opposed indentations in a surface 41 of the joint plate 27 facing towards the joint plate 28. In FIGS. 4A, 4B one of these indentations, namely an indentation 42 is shown. The indentations in the adjacent surfaces 38 and 41 are disposed lying opposite one another. The indentation 40 is oblong, in the manner of a wedge-shaped counterbore, whereas the other indentations of the two surfaces 38, 41 are in particular conical in form. Balls 43 and 44 are disposed between the indentations of the joint plates 27, 28 lying opposite one another. When the coupler 24 is in assembled state, the ball 43 engages in the indentations 40 and 42, and the ball 44 in the indentation 39 and the indentation (not shown) of the surface 41. The arrangements of the indentations in the surfaces 38, 41 and of the balls 43, 44 are rotated by 90° in relation to the arrangements of the indentations in the surfaces 32, 34 and of the balls 36, 37.

The joint plate 27 has a further surface 45 which is facing towards the joint plate 26. In this surface 45 two diametrically opposed indentations are provided of which only one, namely an indentation 46 can be seen in FIGS. 4A, 4B. These two indentations in the surface 45 are also provided with two diametrically opposed indentations in a surface 47 of the joint plate 26 facing towards the joint plate 27. In FIGS. 4A, 4B one of these indentations, namely an indentation 48, is shown. The indentations in the adjacent surfaces 45, 47 are disposed lying opposite one another. The indentation 46 of the surface 45 is oblong, in the manner of a wedge-shaped counterbore, whereas the other indentations of the two surfaces 45, 47 are conical in form. Balls 49 and 50 are disposed between the indentations of the surfaces 45, 47 lying opposite one another. In the assembled state of the coupler 24 the ball 49 engages in the indentations 46 and 48 and the ball 50 in the two indentations (not shown) of the surfaces 45 and 47. The arrangements of the indentations in the surfaces 45, 47 and of the balls 49, 50 are rotated by 90° in relation to the arrangements of the indentations in the surfaces 38, 41 and of the balls 43, 44.

The joint plate 26 has a further surface 51 which is facing towards the connection piece 25. In this surface 51 two diametrically opposed indentations 52 and 53 are provided. These two indentations 52, 53 are also provided with two diametrically opposed indentations 55 and 56 in a surface 54 of the connection piece 25 facing towards the joint plate 26. The indentations in the adjacent surfaces 51 and 54 are disposed lying opposite one another. The indentation 53 is oblong, in the manner of a conical counterbore, whereas the other indentations of the two surfaces 51, 54 are conical in form. Balls 57 and 58 are disposed between the indentations of the joint plate 26 lying opposite one another and of the connection piece 25. When the coupler 24 is in the assembled state, the ball 57 engages in the indentations 52 and 55, and the ball 58 in the indentations 53 and 56. The arrangements of the indentations in the surfaces 51, 54 and of the balls 57, 58 are rotated by 90° in relation to the arrangements of the indentations in the surfaces 45, 47 and of the balls 49, 50.

Between the different balls and indentations lubricants can be added with which the most friction-free possible rotation of the balls is made possible.

The Cardan coupling according to the invention between the spindle nut 23 and the support 12 by means of the joint plates 26, 27, 28 and the connection piece 25 can advantageously be implemented to be of any degree of rigidity. This means that the joint plates 26, 27, 28 and the connection piece 25 can be of any dimensions with regard to the thickness and material, etc. Bending of the joint plates 26, 27, 28 and of the connection piece 25 can therefore be simply avoided. In this way, a particularly high degree of freedom from play can be guaranteed. As a result of the invention the lock against rotation of the spindle nut 23 is advantageously free from play.

A list of reference numbers is: 1 driving apparatus; 2 readout device; 3 storage phosphor layer; 4 storage phosphor plate; 5 scanning device; 6 irradiation device; 7 stimulation radiation; 8 emission radiation; 9 detection device; 10 light conductor; 11 photomultiplier; 12 support; 13 guide rail; 14 guide rail; 15 guide rollers; 16 threaded spindle; 17 spindle bearing; 18 spindle bearing; 19 coupling; 20 friction wheel gear; 21 elastic coupling; 22 step motor; 23 spindle nut; 24 coupler; 25 connection piece; 26 joint plate; 27 joint plate; 28 joint plate; 29 tension springs; 30 suspensions; 31 central hole; 32 surface of the spindle nut; 33 indentation; 34 surface; 35 indentation; 36 ball; 37 ball; 38 surface; 39 indentation; 40 indentation; 41 surface; 42 indentation; 43 ball; 44 ball; 45 surface; 46 indentation; 47 surface; 48 indentation; 49 ball; 50 ball; 51 surface; 52 indentation; 53 indentation; 54 surface; 55 indentation; 56 indentation; 57 ball; 58 ball; and V shift direction.

While this invention has been particularly shown and described with references to preferred embodiments thereof, it will be understood by those skilled in the art that various changes in form and details may be made therein without departing from the scope of the invention encompassed by the appended claims.

What is claimed is:

1. A driving apparatus for an optical scanning device, comprising:
   a threaded spindle onto which a spindle nut is threaded; and
   coupler for coupling the spindle nut to the scanning device, the coupler effecting a coupling in the manner of a Cardan or universal joint.

2. The apparatus according to claim 1, wherein the coupler has a connection piece, which is discoidal, for connecting to the scanning device and at least one discoidal joint plate, which is disposed between the spindle nut and the connection piece, the spindle nut, the at least one joint plate and the connection piece being disposed parallel to one another.

3. The apparatus according to claim 2, wherein between both the spindle nut and the at least one joint plate and between the at least one joint plate and the connection piece two diametrically opposed bearings are provided by means of which Cardan axes of rotation are formed.

4. The apparatus according to claim 3, wherein in the surface of the spindle nut facing towards the at least one joint plate and in the surface of the at least one joint plate facing towards the spindle nut, two diametrically opposed indentations are respectively provided, the indentations in the surface of the spindle nut lying opposite those in the surface of the at least one joint plate and balls being disposed between the indentations of the spindle nut lying opposite one another and the at least one joint plate, and in the surface of the connection piece facing towards the at least one joint plate and in the surface of the at least one joint plate facing towards the connection piece two diametrically opposed indentations are also respectively provided, the indentations in the surface of the connection piece lying opposite the indentations in the surface of the at least one joint plate and balls being disposed between the indentations of the connection piece lying opposite one another and the at least one joint plate.

5. The apparatus according to claim 4, wherein one of the four indentations of two surfaces lying opposite one another is in the form of an oblong indentation.

6. The apparatus according to claim 2, wherein the spindle nut and the connection piece are connected to one another by a connection which is designed and arranged such that it holds the coupler together.

7. The apparatus according to claim 6, wherein the connection has at least one spring, a tension spring.

8. The apparatus according to claim 1, wherein the coupler is a Cardan coupling in the manner of a Cardan double joint.

9. The apparatus according to claim 8, wherein three parallel joint plates are provided which are disposed adjacent to one another and between the spindle nut and the connection piece.

10. The apparatus according to claim 1, wherein the scanning device reads out X-ray information stored in a storage phosphor layer.

11. The apparatus according to claim 10, wherein the connection piece is connected to a support onto which the storage phosphor layer is laid.

* * * * *